United States Patent
Okamoto et al.

[15] 3,669,960
[45] June 13, 1972

[54] NOVEL AMIDES OF 3-INDOLYLACETIC ACID

[72] Inventors: Tadashi Okamoto, Ashiya-shi; Tsuyoshi Kobayashi, Minoo-shi; Hisao Yamamoto, Nishinomiya-shi, all of Japan

[73] Assignee: Sumitomo Chemical Company, Ltd., Osaka, Japan

[22] Filed: Aug. 18, 1969

[21] Appl. No.: 851,063

[30] Foreign Application Priority Data

Sept. 10, 1968 Japan.....................43/65457
Sept. 10, 1968 Japan.....................43/65458

[52] U.S. Cl..................260/240 J, 424/274, 260/247.7 K, 260/251 R, 260/293.8, 260/326.13 A, 260/326.14 A, 260/557 R, 260/561 B, 260/562 K
[51] Int. Cl. .....................................C07d 26/56
[58] Field of Search..............260/240 J, 326.13 A, 326.14 A

[56] References Cited

UNITED STATES PATENTS

| | | | |
|---|---|---|---|
| 3,316,260 | 4/1967 | Shen | 260/247.2 |
| 3,342,834 | 9/1967 | Shen | 260/326.12 |
| 3,535,334 | 10/1970 | Yamamoto et al. | 260/240 J X |

FOREIGN PATENTS OR APPLICATIONS 698,378  5/1967  Belgium.............................260/240 J Primary Examiner—John D. Randolph
Attorney—Stevens, Davis, Miller and Mosher

[57] ABSTRACT

Novel 3-indolylacetamide derivatives, and salts thereof, useful for antiinflammatory agents, which are represented by the formula,

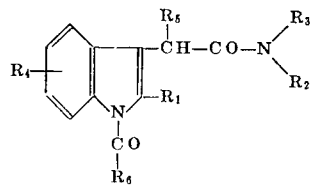

$R_1$ and $R_5$ independently signify hydrogen, methyl or ethyl; $R_2$ signifies $C_1$–$C_4$ alkyl, dialkylaminoalkyl, aralkyl, cycloalkyl, cycloalkylalkyl, carboalkoxyalkyl, carbobenzyloxyalkyl, hydroxyalkyl or heterocyclic ring; $R_3$ signifies hydrogen or alkyl, $R_2$ and $R_3$ being conjugated to form a heterocylic ring; $R_4$ signifies alkoxy, alkyl or halogen; and $R_6$ signifies styryl or methylenedioxyphenyl. These derivatives are produced by reacting a corresponding 3-indolylacetic acid with a corresponding amine derivative or reacting an $N^1$-acylphenyl hydrazine derivative of the formula,

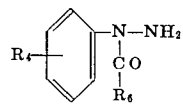

or its salt or its hydrazone derivative with a keto amide derivative of the formula,

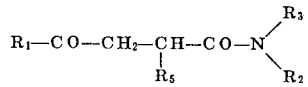

wherein $R_1$, $R_2$, $R_3$, $R_4$, $R_5$ and $R_6$ are as defined above.

1 Claim, No Drawings

NOVEL AMIDES OF 3-INDOLYLACETIC ACID

This invention relates to novel 3-indolylacetamide derivatives and salts thereof having excellent anti-inflammatory activity. More particularly, this invention pertaines to novel 3-indolylacetamide derivatives, and salts thereof, represented by the formula (I),

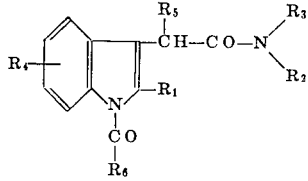

(I)

wherein $R_1$ and $R_5$ signify independently a hydrogen atom or a $C_1-C_2$ alkyl group; $R_2$ signifies a $C_1-C_4$ alkyl group, a di $C_1-C_4$ alkylamino $C_1-C_4$ alkyl group, a $C_7-C_{10}$ aralkyl group, a $C_3-C_6$ cycloalkyl group, a $C_3-C_6$ cycloalkyl-$C_1-C_4$ alkyl group, a carbo-$C_1-C_4$ alkoxy $C_1-C_4$ alkyl group, a carbobenzyloxy $C_1-C_4$ alkyl group, a hydroxy $C_1-C_4$ alkyl group, a heterocyclic ring; $R_3$ signifies a hydrogen atom or a $C_1-C_4$ alkyl group or $R_2$ and $R_3$ can be conjugated to form a heterocyclic ring; $R_4$ signifies a $C_1-C_4$ alkoxy group, a $C_1-C_4$ alkyl group or a halogen atom; $R_6$ signifies a styryl group or a methylenedioxyphenyl group, and processes for producing the same.

The present inventors have studied concerning pharmaceutical properties of many 3-indolylaliphatic acid derivatives and found that novel 3-indolylacetamide derivatives represented by the aforesaid Formula (I) are remarkably superior to known inflammatorial compounds in the point that said 3-indolylacetamide derivatives possess high degree of antiinflammatory activities but exhibit very low toxicities.

One object of the present invention is to provide novel 3-indolylacetamide derivatives having excellent properties as inflammatorial compounds.

Another object of the present invention is to provide processes for producing such novel 3-indolylacetamide derivatives.

Further object of the present invention is to provide novel pharmaceutical compositions containing such novel 3-indolylacetamide derivatives.

Other objects of the present invention will be apparent from the following description.

In order to accomplish these objects, the present invention provides novel 3-indolylacetamide derivatives represented by the Formula (I) and salts thereof.

Further the present invention provides processes for producing the 3-indolylacetamide derivatives, and salts thereof, which comprises, a. contacting a 3-indolylacetic acid derivative represented by the formula,

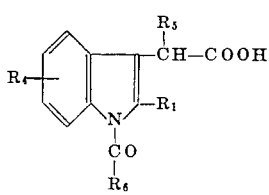

(II)

wherein $R_1$, $R_4$, $R_5$ and $R_6$ are as defined above, or a reactive derivative thereof with an amine derivative represented by the formula,

(III)

wherein $R_2$ and $R_3$ are as defined above, and further, if necessary, contacting the resulting product with an acid or an alkyl halide, or b. contacting an $N^1$-acylphenylhydrazine derivative represented by the formula,

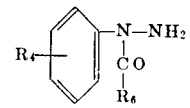

(IV)

wherein $R_4$ and $R_6$ are as defined above, or its salt or its hydrazone derivative with a keto amide derivative represented by the formula,

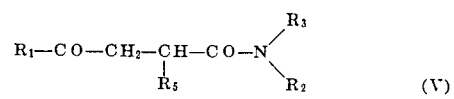

(V)

wherein $R_1$, $R_2$, $R_3$ and $R_5$ are as defined above, or its salt, and further, if necessary, contacting the resulting product with an acid or an alkyl halide.

Still further, the present invention provides a pharmaceutical composition containing, as an essential ingredient, an effective amount of 3-indolylacetamide derivative of the Formula (I).

All of the 3-indolylacetamide derivatives represented by the Formula (I) and salts thereof are new compounds and have not been described in any other literature. These compounds have excellent antipyretic, analgesic and antiinflammatory activities.

In the present invention, novel 3-indolylacetamide derivatives of the aforesaid Formula (I) and salts thereof are obtained easily in high yield by condensing corresponding 3-indolylacetic acid derivative represented by the Formula (II) or reactive derivative thereof with an amine derivative represented by the Formula (III).

In the present invention, amine derivatives represented by the Formula (III) include, for instance, methylamine, ethylamine, propylamine, butylamine, dimethylamine, diethylamine, dipropylamine, dibutylamine, ethanolamine, diethanolamine, piperidine, pyrroline, pyrrolidine, morpholine, 2-aminopyrimidine, β-N,N-dimethylaminoethylamine, β-N,N-diethylaminoethylamine, γ-N,N-dimethylaminopropylamine, γ-N,N-diethylaminopropylamine, benzylamine, phenethylamine, cyclohexylamine, cyclopropylmethylamine, carbomethoxyethylamine, carboethoxyethylamine, carbobenzyloxyethylamine and the like.

In the present invention, reactive derivatives of 3-indolylacetamide derivatives of the Formula (II) include, for instance, acid chloride, acid bromide, acid anhydride, methyl ester, ethyl ester, tosyl ester, benzyl ester, and the like.

More particularly, 3-indolylacetamide derivatives of the Formula (I) are obtained by reacting the corresponding 3-indolylacetic acid derivatives of the Formula (II) with an amine derivative of the Formula (III) in the presence or absence of dehydrating agent, such as dicyclohexylcarbodiimide, or by reacting 3-indolylacetic acid halide derivatives with an amine derivative of the Formula (III) in the presence or absence of base, such as sodium hydroxide, potassium hydroxide, sodium carbonate, pyridine, triethylamine and the like. It is, in general, preferable to use these dehydrating agent or base.

These reactions are usually carried out in the presence of a solvent such as ether, tetrahydrofuran, dioxane, methanol, ethanol, benzene, toluene, pyridine, chloroform, dimethylformamide, dimethylsurfoxide or the like, and it is preferable to use a solvent in the reaction in general.

These reactions are carried out at room temperature, in general, but if desired, the reactions may be controlled by heating or cooling, though the heating is not always necessary.

3-Indolylacetamide derivatives represented by the Formula (I) are also obtained by reacting an $N^1$-acylphenylhydrazine derivative represented by the Formula (IV), or its salt or its hydrazone derivative, with a keto amide derivative represented by the Formula (V), or its salt.

N¹-acyl phenylhydrazine derivative of the Formula (IV) may be used as an acid salt, such as hydrochloride, hydrobromide, phosphate or the like.

As a hydrazone derivative of the Formula (IV), acetaldehyde hydrazone, benzaldehyde hydrazone or diphenylketone hydrazone is commercially preferable in the reaction. The reaction is carried out in the presence or absence of a solvent with a condensing agent. The solvent includes, for example, acetic acid, propionic acid, benzene, toluene, xylene, cyclohexane, dioxane, isopropylether, butyl alcohol, ethyleneglycol and the like. The condensing agents include, for example, hydrochloric acid, hydrobromic acid, sulfuric acid, zinc chloride, polyphosphoric acid, acetic acid and the like. The reaction is preferably carried out at 80° – 140° C.

Further according to the present invention, acid salts of 3-indolylacetamide derivatives of the Formula (I) are produced by treating the 3-indolylacetamide derivatives of the Formula (I) with a mineral acid such as hydrochloric acid, hydrobromic acid, sulfuric acid, phosphoric acid or the like, or with an organic acid such as maleic acid, tartaric acid, fumaric acid, succinic acid, citric acid, acetic acid or the like. And the quaternary ammonium salts can be prepared by reaction of the free base of the Formula (I) with an alkylhalide, such as methyliodide, methylbromide, ethylbromide or the like.

According to the process of the present invention, there are obtained 3-indolylacetamide derivatives and acid addition salts thereof, such as shown below.

N-Methyl-1-cinnamoyl-2-methyl-5-methoxy-3-indolylacetamide.

N-(2'-Pyrimidinyl)-1-cinnamoyl-2-methyl-5-methoxy-3-indolylacetamide.

N-(β-N',N'-diethylaminoethyl)-1-cinnamoyl-2-methyl-5-methoxy-3-indolylacetamide.

N-(β-N',N'-dimethylaminoethyl)-1-cinnamoyl-2-methyl-5-methoxy-3-indolylacetamide.

N,N-Diethyl-1-cinnamoyl-2-methyl-5-methoxy-3-indolylacetamide.

N,N-Diisopropyl-1-cinnamoyl-2-methyl-5-methoxy-3-indolylacetamide.

N-Isopropyl-1-cinnamoyl-2-methyl-5-methoxy-3-indolylacetamide.

N-Benzyl-1-cinnamoyl-2-methyl-5-methoxy-3-indolylacetamide.

N-Methyl-1-cinnamoyl-2-methyl-5-chloro-3-indolylaetamide.

N-Methyl-1-cinnamoyl-2,5-dimethyl-3-indolylacetamide.

N-Ethyl-α-(1-cinnamoyl-2-methyl-5-methoxy-3-indolyl)propionamide.

N-Carbomethoxyethyl-1-cinnamoyl-2-methyl-5-methoxy-3-indolylacetamide.

N-Cyclohexyl-1-cinnamoyl-2-methyl-5-methoxy-3-indolylacetamide.

N-(3'-Isobutyl)-1-cinnamoyl-2-methyl-5-methoxy-3-indolylacetamide.

N-Carbobenzyloxy-1-cinnamoyl-2-methyl-5-methoxy-3-indolylacetamide.

N-(β-Hydroxyethyl)-1-cinnamoyl-2-methyl-5-methoxy-3-indolylacetamide.

N-(1-Cinnamoyl-2-methyl-5-methoxy-3-indolylacetyl)morpholine.

N¹-(1-Cinnamoyl-2-methyl-5-methoxy-3-indolylacetyl)-N⁴-benzylpiperazine.

N-(1-Cinnamoyl-2-methyl-5-methoxy-3-indolylacetyl)-piperidine.

N-Methyl-1-(3',4'-methylenedioxybenzoyl)-2°-methyl-5-methoxy-3-indolylacetamide.

N-Methyl-(β-N',N'-diethylaminoethyl)-1-(3',4'-methylenedioxybenzoyl)-2-methyl-5-methoxy-3-indolylacetamide.

N-(β-N',N'-dimethylaminoethyl)-1-(3',4'-methylenedioxybenzoyl)-2-methyl-5-methoxy-3-indolylacetamide.

N,N-Diethyl-1-(3',4'-methylenedioxybenzoyl)-2-methyl-5-methoxy-3-indolylacetamide.

N,N-Diisopropyl-1-(3',4'-methylenedioxybenzoyl)-2-methyl-5-methoxy-3-indolylacetamide.

N-Isopropyl-1-(3',4'-methylenedioxybenzoyl)-2-methyl-5-methoxy-3-indolylacetamide.

N-Ethyl-1-(3',4'-methylenedioxybenzoyl)-2-methyl-5-methoxy-3-indolylacetamide.

N-Methyl-1-(3',4'-methylenedioxybenzoyl)-2-methyl-5chloro-3-indolylacetamide.

N,N-Dimethyl-1-(3',4'-methylenedioxybenzoyl)-2,5-dimethyl-3-indolylacetamide.

N-Ethyl-α-[1-(3',4'-methylenedioxybenzoyl)-2-methyl-5-methoxy- 3-indolyl]propionamide.

N-Carboethoxyethyl-1-(3',4'-methylenedioxybenzoyl)-2-methyl-5- methoxy-3-indolylacetamide.

N-Cyclohexyl-1-(3',4'-methylenedioxybenzoyl)-2-methyl-5-methoxy-3-indolylacetamide.

N-(β-Hydroxyethyl-1-(3',4'-methylenedioxybenzoyl)-2-methyl-5-methoxy-3-indolylacetamide.

N-{1-(3',4'-Methylenedioxybenzoyl)-2-methyl-5-methoxy-3-indolylacetyl}-morpholine.

N-{1-(3',4'-Methylenedioxybenzoyl)-2-methyl-5-methoxy-3-indolylacetyl}-piperidine and their hydrochlorides, hydrobromides, sulfates, phosphates, maleates, tartarates, succinater, citrates, acetates, methylbromides, and methyliodides.

These present compounds possess a high degree of antiinflammatory activity and hence are of value in mitigating the symptoms associated with rheumatic and other inflammatory conditions as well as preventing or suppressing the occurrence of inflammation. These present compounds exhibit lower toxicities than the corresponding parent compounds, and seldom cause occult bleeding in feces in animal tests at high dose level, even at over 400 mg/kg per os. In spite of the remarkably low toxicity, these present compounds show notably excellent inhibitions of carrageenin-induced foot edema of rats, so the therapeutic ratios (lethal dose/effective dose) of these compounds are much greater than the first class antiinflammatory drugs, such as indomethacin, phenylbutazone, etc. (Table 1).

TABLE 1

Anti-inflammatory Activity[a]

| Compound Name | Dose[b] mg/kg | Inhibition[c] of edema | Toxicity[d] |
|---|---|---|---|
| N-(1-Cinnamoyl-2-methyl-5-methoxy-3-indolylacetyl)-morpholine | 50 | 27.3 | — |
| N-(3',3-Dimethylamino propyl)-1-cinnamoyl-2-methyl-5-methoxy-3-indolyl-acetamide | 50 | 24.6 | — |
|  | 200 | 39.5 | — |
|  | 400 | 54.4 | — |
| N-(β-Hydroxyethyl)-1-cinnamoyl-2-methyl-5-methoxy-3-indolylacetamide | 50 | 10.8 | — |
|  | 200 | 42.5 | — |
| N,N-Dimethyl-1-cinnamoyl-2-methyl-5-methoxy- 3-indolyl-acetamide | 50 | 14.5 | — |
|  | 200 | 36.8 | — |
|  | 400 | 48.5 | — |
| N-(β-Hydroxyethyl)-1-(3',4'-methylenedioxybenzoyl)-2-methyl-5-methoxy-3-indolyl-acetamide | 50 | 33.6 | — |
|  | 400 | 43.6 | — |
| Phenylbutazone | 100 | 40.6 | — |
|  | 200 | 51.2 | ++ |

[a]Anti-inflammatory activity was evaluated by the inhibitory effect on rat hind paw edema induced by injection of 0.05 ml. of 1 percent carrageenin in sterile 0.9 percent NaCl.

(b)Test compounds were administrated orally 1 hour before the injection of carrageenin. At each dose level, three to six rats were used.

(c)Foot volume was measured at 3, 4 and 5 hours after the carrageenin injection and the mean of these measurements was calculated in each rat. Inhibition of edema is expressed as $(1 - T/C) \times 100$, where T is the mean edema volume of treated group and C is the mean volume of control group.

(d)—; no blood in feces, body weight gain normal.

++; blood in feces, body weight decreased.

They are preferably administrated by an oral route. The pharmaceutically acceptable acid-addition salts are preferred. The compounds of the invention can be combined with either a solid or liquid carrier or diluent and made available in varying amounts in such conventional pharmaceutical forms as tablets, dragees, capsules, powders, suspension and solutions.

The present invention will be illustrated in further detail below with reference to examples, but the examples are merely illustrative and the invention is not limited only to these.

EXAMPLE 1

To a solution of 10.5 g. of 1-cinnamoyl-2-methyl-5-methoxy-3-indolylacetic acid in 100 ml. of tetrahydrofuran and 3.1 g. of triethylamine is added 3.3 g. of ethyl chloroformate at 0° C. After the reaction mixture is stirred for 0.5 hour at 5° C. gaseous dimethylamine is introduced to the reaction mixture.

The reaction mixture is stirred for 3.5 hours at 5° C. and the solvent and excess dimethylamine are removed under reduced pressure. Water is added to the residue and the mixture is extracted with 200 ml. of benzene. The benzene layer is washed with water and dried over sodium sulfate. The solvent is removed under reduced pressure to give 11 g. of oil. Ether and small amount of benzene is added to the oil to deposit crystals. Recrystallization from ethanol give N,N-dimethyl-1-cinnamoyl-2-methyl-5-methoxy-3-indolylacetamide having a melting point of 118.5° – 119° C.

EXAMPLE 2

To a solution of 5.5 g. of 1-(3',4'-methylenedioxybenzoyl)-2-methyl-5-methoxy-3-indolylacetic acid in 80 ml. of tetrahydrofuran and 1.6 g. of triethylamine is added 1.8 g. of ethyl chloroformate at 5° C. After the reaction mixture is stirred for 0.5 hour at 5° C., 1 g. of β-aminoethanol is added to the reaction mixture.

The reaction mixture is stirred for 3 hours at 5° C. and the solvent is removed under reduced pressure. Water is added to the residue and the deposited crystals are collected by filtration and recrystallized from ethanol to give N-(β-hydroxyethyl) 1-(3',4'-methylenedioxybenzoyl)-2-methyl-5-methoxy-3-indolylacetamide. m.p. 165° C.

According to the procedure mentioned above, there are obtained following compounds. N-Methyl-1-cinnamoyl-2-methyl-5-methoxy-3-indolylacetamide.

Oily substance.

N-(β-Hydroxyethyl)-1-cinnamoyl-2-methyl-5-methoxy-3-indolylacetamide. M.P. 171° C.

N-(1-Cinnamoyl-2-methyl-5-methoxy-3-indolylacetyl)-morpholine. M.P. 138°–139° C.

N-(2'-Pyrimidinyl)-1-cinnamoyl-2-methyl-5-methoxy-3-indolylacetamide. M.P. 157°–158° C.

N-(3',3'-Dimethylaminopropyl)-1-cinnamoyl-2-methyl-5-methoxy- 3-indolylacetamide. M.P. 143°–144° C.

N-methyl-α-(1-cinnamoyl-2-methyl-5-methoxy-3-indolyl)-propionamide. Oily substance.

N,N-Dimethyl-1-(3', 4'-methylenedioxybenzoyl)-2-methyl-5-methoxy-3-indolylacetamide. M.P. 143°–145° C.

1-(3', 4'-Methylenedioxybenzoyl)-2-methyl-5-methoxy-3-indolylacetyl morpholine. M.P. 172°–174° C.

EXAMPLE 3

A mixture of 6.1 g. of N¹-cinnamoyl-p-methoxy phenylhydrazine hydrochloride, 3.4 g. of N,N-dimethyl levulinamide and 60 ml. of iso-propanol is stirred under reflux for 5 hours. The solvent is removed under reduced pressure to the residue, to which is added water and the mixture is extracted with benzene.

The benzene layer is washed with water and dried over sodium sulfate.

The solvent is removed under reduced pressure to give N,N-dimethyl-1-cinnamoyl-2-methyl-5-methoxy-3-indolylacetamide. Recrystallization from ethanol give yellow needles having a melting point of 118°–119° C.

According to the procedure mentioned above, there are obtained following compounds.

N-(2'-Pyrimidinyl)-1-cinnamoyl-2-methyl-5-methoxy-3-indolylacetamide. M.P. 157°–158° C.

1-Cinnamoyl-2-methyl-5-methoxy-3-indolylacetyl morpholine. M.P. 138°–139° C.

1-(3',4'-Methylenedioxybenzoyl)-2-methyl-5-methoxy-3-indolylacetyl morpholine. M.P. 172°–174° C.

N-Methyl-1-cinnamoyl-2-methyl-5-methoxy-3-indolylacetamide. Oily substance.

N,N-Dimethyl-1-(3',4'-methylenedioxybenzoyl)-2-methyl-5-methoxy-3-indolylacetamide. M.P. 143°–145° C.

What we claim is:

1. A compound selected from the group consisting of N-(1-cinnamoyl-2-methyl-5-methoxy-3-indolylacetyl)-morpholine, N-(3',3-dimethylaminopropyl)-1-cinnamoyl-2methyl-5-methoxy-3-indolylacetamide, N-(β-hydroxyethyl)-1-cinnamoyl-2methyl-5-methoxy-3-indolylacetamide N,N-dimethyl-1-cinnamoyl-2-methyl-5-methoxy-3-indolylacetamide and N-(β-hydroxyethyl)-1-(3',4'-methylenedioxybenzoyl)-2-methyl-5-methoxy-3-indolylacetamide.

* * * * *